(12) United States Patent
Hessmert et al.

(10) Patent No.: US 6,918,290 B2
(45) Date of Patent: Jul. 19, 2005

(54) METHOD AND DEVICE FOR REGULATING AT LEAST ONE VEHICLE DYNAMICS VARIABLE

(75) Inventors: Ulrich Hessmert, Schwieberdingen (DE); Jost Brachert, Ditzingen (DE); Thomas Sauter, Remseck (DE); Helmut Wandel, Markgroeningen (DE); Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 10/449,939

(22) Filed: May 30, 2003

(65) Prior Publication Data

US 2004/0045349 A1 Mar. 11, 2004

(30) Foreign Application Priority Data

Jun. 8, 2002 (DE) .......................................... 102 25 447

(51) Int. Cl.⁷ ............................................. G01M 17/02
(52) U.S. Cl. ........................................................ 73/146
(58) Field of Search ............................... 73/146, 146.2, 73/146.3, 146.5, 146.8; 340/442–447; 152/416

(56) References Cited

U.S. PATENT DOCUMENTS

| | | | | |
|---|---|---|---|---|
| 5,541,573 A | * | 7/1996 | Jones | 340/444 |
| 5,721,374 A | * | 2/1998 | Siekkinen et al. | 73/146.2 |
| 5,760,682 A | * | 6/1998 | Liu et al. | 340/444 |
| 5,849,120 A | * | 12/1998 | Drieux | 152/416 |
| 6,222,444 B1 | * | 4/2001 | Wang | 340/442 |
| 6,294,989 B1 | * | 9/2001 | Schofield et al. | 340/442 |

FOREIGN PATENT DOCUMENTS

DE 199 61 681 10/2000

* cited by examiner

*Primary Examiner*—William Oen
(74) *Attorney, Agent, or Firm*—Kenyon & Kenyon

(57) ABSTRACT

A method of regulating at least one variable characterizing the vehicle dynamics,
a loss of pressure in a vehicle tire being determined;
the position of the underinflated tire being determined, wherein
during cornering, regulation of the variable which characterizes vehicle dynamics is dependent upon whether the underinflated tire is on the inside or outside of the turn being executed by the vehicle.

8 Claims, 2 Drawing Sheets

METHOD AND DEVICE FOR REGULATING AT LEAST ONE VEHICLE DYNAMICS VARIABLE

BACKGROUND INFORMATION

German Patent Application No. 199 61 681 has already described a method and a device for detecting a loss of tire pressure and regulating the vehicle dynamics. The detection method there operates as a function of at least one vehicle dynamics variable. Vehicle dynamics is also regulated as a function of a detected loss of tire pressure.

SUMMARY OF THE INVENTION

The present invention is directed to a method for regulating at least one variable characterizing the dynamics of a vehicle, in which a loss of tire pressure in a vehicle tire is determined and the position of the underinflated tire is ascertained. The core of the present invention is that when the vehicle is executing a turn, the variable characterizing vehicle dynamics is regulated as a function of whether the underinflated tire is located on the inside or outside of the turn being executed by the vehicle.

Driving with an underinflated tire means impaired safety for the vehicle. When cornering a corner, however, the wheels on the inside of the turn are relieved while the wheels on the outside of the turn are under a greater load. It is therefore appropriate and advantageous to design the regulation of the variable characterizing the vehicle dynamics to be based on whether the underinflated tire is on the inside or outside of the turn.

In a particularly advantageous embodiment, the variable characterizing the vehicle dynamics is the transverse acceleration. Transverse acceleration is easily detectable by sensors. Many modern vehicles already have a transverse acceleration sensor, for example. Transverse acceleration may also be determined easily from other sensor signals (e.g., the wheel rotational speed).

Another advantageous embodiment is characterized in that a maximum value is assigned to the variable characterizing the vehicle dynamics and must not be exceeded, this maximum value depending on whether the underinflated tire is situated on the inside or outside of the turn being executed by the vehicle. In particular for the case when the underinflated tire is on the outside of the turn (in this case it is under a greater load than a tire on the inside of the turn), a lower maximum value will be selected.

In addition, it is advantageous if the maximum value for the case when the underinflated tire is on the outside of the turn being executed by the vehicle depends at least on the amount of tire pressure loss. This makes it possible to lower the maximum value to a greater extent when there is a great loss of pressure than in the case of a small loss of pressure. Any emergency operation capability of the tire may also be taken into account here.

Another advantageous embodiment is characterized in that the maximum value additionally depends on the vehicle speed in the case when the underinflated tire is on the outside of the turn being executed by the vehicle. In this case it is possible to take into account in particular the fact that a smaller maximum value is allowed at higher vehicle speeds.

In another advantageous embodiment, the maximum value is independent of the amount of pressure loss in the case when the underinflated tire is on the inside of the turn being executed by the vehicle. This makes use of the property whereby a tire on the inside of a turn being executed by the vehicle is under a much lower load during a turn than a tire on the outside of the turn.

A device for regulating at least one variable characterizing the vehicle dynamics includes regulating means for regulating the variable characterizing the vehicle dynamics and pressure loss detecting means for detecting a loss of tire pressure and the position of the tire on the vehicle. The essence according to the present invention of this device is that cornering detection means for detecting that the vehicle is cornering a corner are provided, and the regulation of the variable characterizing the vehicle dynamics in the regulating means is based on whether, in the event when cornering a corner is detected by the cornering detection means, the underinflated tire is on the inside or outside of the turn being executed by the vehicle.

DETAILED DESCRIPTION

Figure 1:
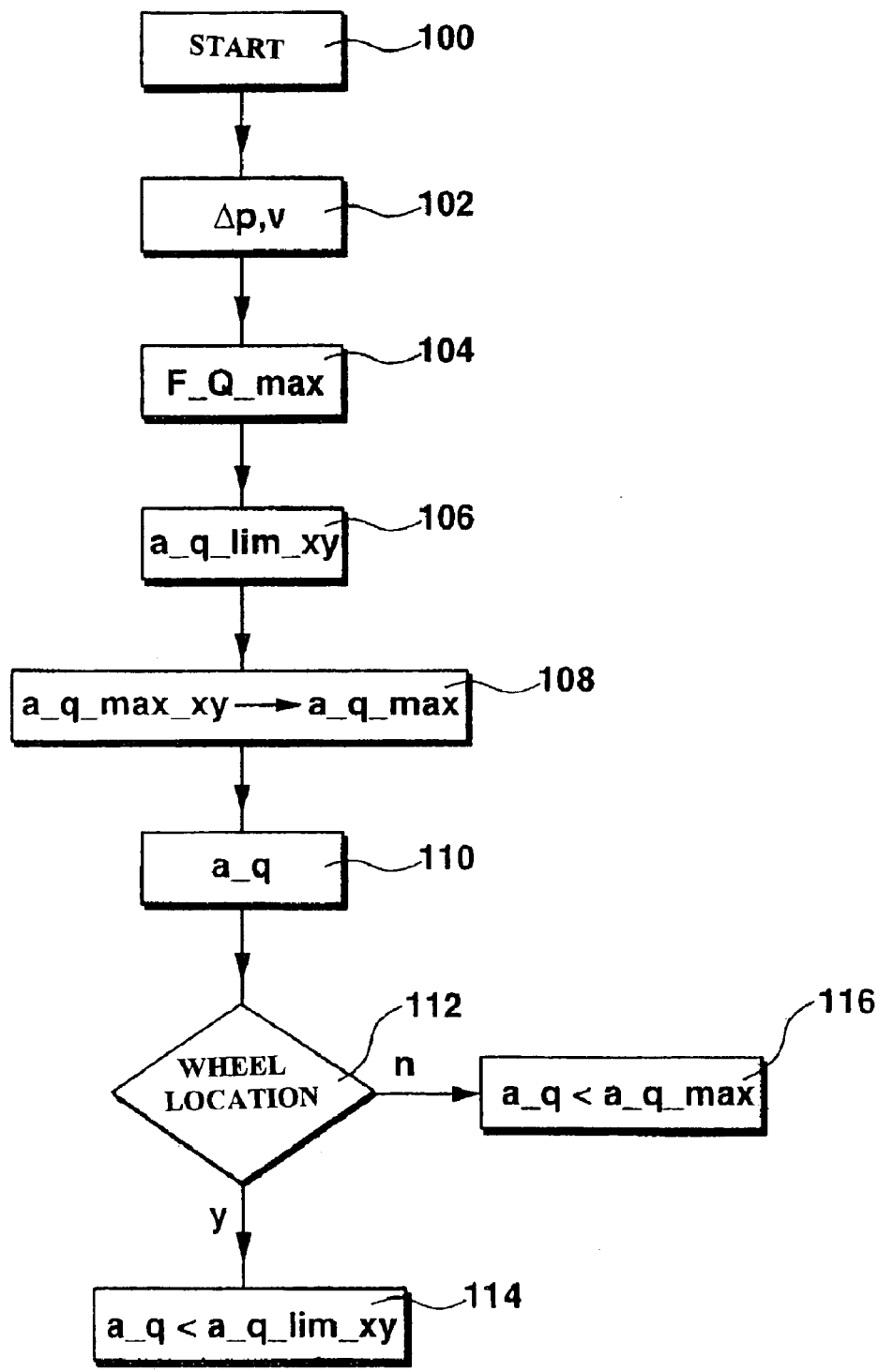
FIG. 1 shows a flow chart illustrating the sequence of the method according to the present invention.

In motor vehicles having tire pressure monitoring, a loss of tire pressure is indicated to the driver. In addition to the fact that a pressure loss has occurred, this information may also include the position of the wheel showing the pressure loss (e.g., left front wheel). In addition, this information is relayed to systems which increase the driving stability and safety of the vehicle. These systems then prevent critical driving states. Such systems may include in particular ABS systems or vehicle dynamics control systems (FDR, ESP, . . . ).

In a modified regulation strategy (e.g., in the case of a vehicle dynamics control system) which takes into account the information "wheel (tire) xy is underinflated," critical driving states are prevented by limiting the allowed transverse acceleration to different extents when cornering left versus cornering right.

The information "wheel xy is underinflated" presupposes that the wheel showing a loss of tire pressure has been identified, xy indicating the position of the wheel, where xy may assume the following values:

xy=VL means that the left front wheel is showing a loss of pressure;

xy=VR means that the right front wheel is showing a loss of pressure;

xy=HL and xy=HR refer to the left rear wheel and the right rear wheel, respectively.

The information regarding which wheel is showing a loss of pressure may be made available to the driver. Suitable means include, e.g., a warning light (a separate warning light being assigned to each wheel) or a display. In addition, this information is also made available to other systems, e.g., a vehicle dynamics control system ESP (ESP=electronic stability program) via suitable information channels (CAN, PWM signal over a separate line, . . . ). As soon as a loss of tire pressure has been detected, a critical driving state may then be prevented by an electronic stability program in the following way:

1. Depending on the type of tire, the maximum allowed transverse force is determined as a function of the loss of pressure for underinflated tire xy. By using a tire coding system, it is possible to access a stored characteristics map for allowed transverse force F_Q_max: F_Q_max=f (pressure loss Δp, speed v). If this maximum transverse force is exceeded, the tire will separate from the rim.
2. F_Q_max is determined at regular intervals and updated in cycles.
3. If the underinflated tire is on the outside of the turn, allowed transverse acceleration a_q_lim_xy is calculated from F_Q_max for the underinflated tire. The a_q_lim_xy variable is a tire-specific variable and is the transverse acceleration which may act upon a tire in the instantaneous driving state before the tire separates from the rim. The tire contact force acting on wheel xy also enters into the determination of a_q_lim_xy.
4. The maximum physical transverse acceleration a_q_max_xy is determined for all wheels as a function of, e.g., wheel contact force, wheel load, steering angle, and speed. The a_q_max_xy variable is a variable depending on the physics of the driving operation and is the transverse acceleration at which the maximum possible lateral traction exertable from the road surface onto the tires is reached. The pressure loss does not enter into the a_q_max_xy variable.
5. A maximum allowed transverse acceleration a_q_max is determined from values a_q_max_xy determined for all wheels. This may be accomplished, e.g., by taking the maximum of all values a_q_max_xy or by forming an average (possibly weighted).
6. Next, instantaneous transverse acceleration a_q for the vehicle is determined. This is possible by analysis of variables such as sensor signal a_q of the transverse acceleration sensor or by analyzing other variables, e.g., the steering angle, speed or torque balance.

The transverse acceleration is then limited by measures taken by a brake regulating system, e.g., an ESP system. Depending on whether the tire pressure loss has occurred on a wheel on the inside or outside of a turn, different procedures will then be followed.

Case 1:
The tire pressure loss occurs on a wheel on the outside of the turn. Then the transverse acceleration is limited to value a_q_lim_xy assigned to the underinflated tire. This is associated with the fact that when cornering a corner, the wheels on the outside of the turn are under a greater load. Therefore, transverse acceleration is limited by the underinflated tire.

Case 2:
The pressure loss occurs in a tire on the inside of the turn. In this case, transverse acceleration is limited to a_q_max. In this case, the pressure loss has no effect on the limitation of transverse acceleration.

With this individual limitation on transverse acceleration, the movement of the vehicle is restricted only as much as necessary for the safety of the vehicle.

FIG. 1 illustrates the sequence of the method according to the present invention. The method begins in block 100 and then proceeds to block 102 where longitudinal speed v of the vehicle is determined and where the presence of an underinflated wheel (tire) is also detected. Pressure loss Δp is determined on this underinflated wheel. Then the sequence proceeds to block 104. Maximum allowed transverse force F_Q_max for the underinflated wheel is calculated in block 104. Then the system proceeds to block 106. In block 106, a maximum allowed transverse acceleration a_q_lim_xy is calculated for the underinflated wheel (if it is on the outside of the turn). Then a physically maximum transverse acceleration a_q_max_xy is calculated for each wheel in block 108.

Then in block 110, prevailing transverse acceleration a_q for the vehicle is determined. In block 112, the question of whether the underinflated wheel is on the outside of the turn is asked. If the answer is no (indicated by "n"), the sequence branches off to block 116, where transverse acceleration is then limited to a_q_max. To do so, a_q_max is determined from a_q_max_xy. However, if the answer in block 112 is yes (indicated as "y"), then the sequence branches off to block 114, where transverse acceleration is limited to a_q_lim_xy.

Figure 2:
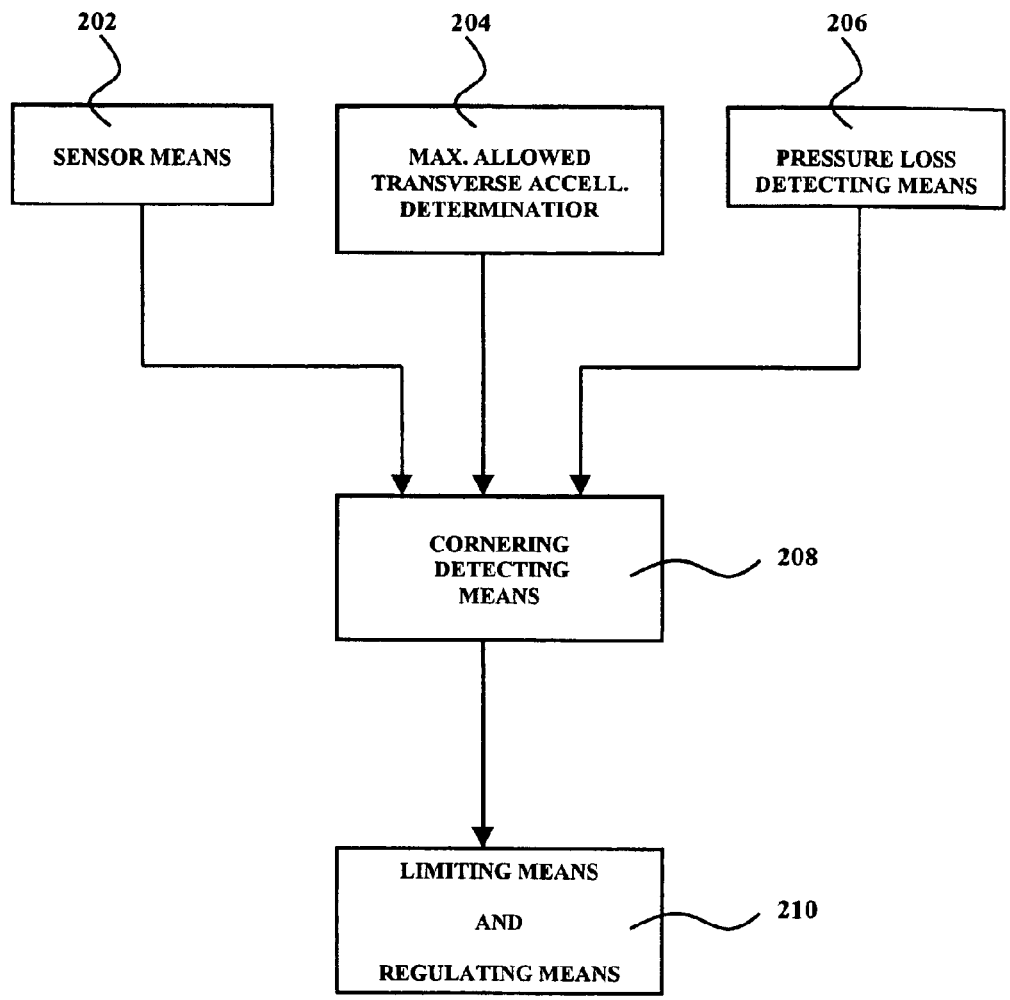
FIG. 2 shows a block diagram illustrating the structure of the device according to the present invention.

FIG. 2 illustrates the design of the device according to the present invention. Block 202 contains sensor means in which transverse acceleration a_q is determined for the vehicle. In block 204, maximum allowed transverse acceleration a_q_max is determined. Block 206 contains pressure loss detecting means which detect an underinflated wheel and which calculate allowed transverse acceleration a_q_lim_xy for this wheel. Output signals from blocks 202, 204 and 206 are sent to block 208. Block 208 includes cornering detection means, which ascertain whether the vehicle is executing a turn. These means also determine whether the underinflated wheel is on the inside or outside of the turn. Output signals of block 208 are relayed to block 210, which contains limiting means and regulating means. Suitable braking measures for reducing vehicle speed are performed in this block.

If the vehicle has a plurality of wheels having underinflated tires, the method described here may be implemented separately for each of these wheels. The transverse acceleration is then limited to the smallest of the limit values thus obtained.

What is claimed is:

1. A method for regulating at least one variable which characterizes the dynamics of a vehicle, the method comprising:

detecting a loss of tire pressure in a tire on the vehicle, the tire being deemed to be underinflated based on the detection;

determining a position of the underinflated tire; and when the vehicle is executing a turn, regulating the variable which characterizes the vehicle dynamics dependent upon whether the underinflated tire is on an inside or an outside of the turn being executed by the vehicle by limiting a transverse acceleration to a physically maximum transverse acceleration if the underinflated tire is on the inside and limiting the transverse acceleration to a maximum allowed transverse acceleration if the underinflated tire is on the outside.

2. The method according to claim 1, wherein, when the underinflated tire is on the outside of the turn, the maximum allowed transverse acceleration depends at least on an amount of tire pressure loss.

3. The method according to claim 2, wherein, when the underinflated tire is on the outside of the turn, the maximum allowed transverse acceleration further depends on a speed of the vehicle.

4. The method according to claim 1, wherein, when the underinflated tire is on the inside of the turn, the physically maximum transverse acceleration is independent of a tire pressure loss.

5. A device for regulating at least one variable which characterizes the dynamics of a vehicle, the device comprising:

means for detecting a pressure loss in a tire on the vehicle, as well as a position of the tire on the vehicle;

means for detecting cornering of the vehicle; and means for regulating the variable which characterizes the vehicle dynamics as a function of whether the underinflated tire is situated on an inside or an outside of a turn being executed by the vehicle when cornering is detected by limiting a transverse acceleration to a physically maximum transverse acceleration if the underinflated tire is on the inside and limiting the transverse acceleration to a maximum allowed transverse acceleration if the underinflated tire is on the outside.

6. The device according to claim 5, wherein, when the underinflated tire is on the outside of the turn, the maximum allowed transverse acceleration depends at least on an amount of tire pressure loss.

7. The device according to claim 5, wherein, when the underinflated tire is on the outside of the turn, the maximum allowed transverse acceleration further depends on a speed of the vehicle.

8. The device according to claim 5, wherein, when the underinflated tire is on the inside of the turn, the physically maximum transverse acceleration is independent of a tire pressure loss.

* * * * *